United States Patent [19]

Ims

[11] Patent Number: 4,797,692

[45] Date of Patent: Jan. 10, 1989

[54] THERMAL INK JET PRINTER HAVING INK NUCLEATION CONTROL

[75] Inventor: Dale R. Ims, Webster, N.Y.

[73] Assignee: Xerox Corporation, Stamford, Conn.

[21] Appl. No.: 92,111

[22] Filed: Sep. 2, 1987

[51] Int. Cl.[4] ...................... G01D 15/16; C09D 11/00

[52] U.S. Cl. .................................... 346/140 R; 106/20

[58] Field of Search .................... 346/140, 1.1; 106/22, 106/20

[56] References Cited

U.S. PATENT DOCUMENTS

| | | | |
|---|---|---|---|
| 3,577,515 | 5/1971 | Vandegaer | 424/32 |
| 4,309,213 | 1/1982 | Graber et al. | 71/120 |
| 4,345,262 | 8/1982 | Shirato | 346/140 |
| 4,395,288 | 7/1983 | Eida et al. | 106/22 |
| 4,409,039 | 10/1983 | Lepesant et al. | 106/20 |
| 4,532,530 | 7/1985 | Hawkins | 346/140 R |
| 4,571,599 | 2/1986 | Rezanka | 346/140 R |
| 4,601,777 | 7/1986 | Hawkins et al. | 156/626 |
| 4,638,337 | 1/1987 | Torpey et al. | 346/140 R |
| 4,723,129 | 2/1988 | Endo | 346/140 X |

OTHER PUBLICATIONS

R. A. Mackay et al; "Interreactions and Reactions in Microemulsions", pp. 801–816.

*Primary Examiner*—Joseph W. Hartary
*Attorney, Agent, or Firm*—Robert A. Chittum

[57] ABSTRACT

A thermal ink jet printer uses a water-based ink containing a second liquid suspended therein which effects rapid bubble growth with lower pulse power levels. The second liquid, such as hexane, acts as a nucleation trigger for the water-based ink. To be effective in ink nucleation control, the homogeneous nucleation temperature of the second liquid suspension must be below the water-based ink's heterogeneous nucleation temperature and the suspended phase must be present in the form of small droplets with a high number density.

5 Claims, 1 Drawing Sheet

THERMAL INK JET PRINTER HAVING INK NUCLEATION CONTROL

BACKGROUND OF THE INVENTION

1. Field of the Invention

This invention relates to thermal ink jet printers and more particularly to thermal ink jet printers utilizing a water-based ink having a second liquid suspended therein with a nucleation temperature lower than that of the water in order to act as a nucleation trigger to effect more rapid ink bubble growth.

2. Description of the Prior Art

In drop-on-demand ink jet printing systems, a droplet is expelled from a nozzle directly to the recording medium along a substantially straight trajectory that is substantially perpendicular to the recording medium. The droplet expulsion is in response to digital information signals and a droplet is not expelled unless it is to be placed on the recording medium.

There are two basic propulsion techniques for the drop-on-demand ink jet printers. One uses a piezoelectric transducer to produce pressure pulses selectively to expel the droplets, and the other technique uses thermal energy, usually the momentary heating of a resistor, to produce a vapor bubble in the ink, which during its growth, expels a droplet. Either technique uses ink filled channels which interconnect an orifice and an ink filled manifold. The pressure pulse from the piezoelectric transducer may be generated anywhere in the channels or manifold. However, the pressure pulse generated by a resistor must be produced in each channel near the orifice or nozzle.

In thermal ink jet printers, sometimes referred to as bubble jet printers, printing signals representing binary digital information originate an electric current pulse of a predetermined time duration in a small resistor within each ink channel near the nozzle, causing the ink in the immediate vicinity to evaporate almost instantaneously and to create a vapor bubble. The ink at the orifice is forced out as a propelled droplet by the bubble. After termination of the current pulse, the bubble collapses and the process is ready to start all over again as soon as hydrodynamic motion or turbulence of the ink stops. The turbulence in the channel generally subsides in fractions of milliseconds, so that thermally expelled droplets may be generated in the KHz range. For a more detailed explanation of the operation and construction of a thermal ink jet printer, refer to U.S. Pat. No. 4,532,530.

Existing thermal ink jet printers usually have a printhead mounted on a carriage which traverses back and forth across the width of a stepwise movable recording medium. The printhead generally comprises a vertical array of nozzles which confronts the recording medium. Ink filled channels connect to an ink supply reservoir, so that as the ink in the vicinity of the nozzles is used, it is replaced from the reservoir. Small resistors in the channels near the nozzles are individually addressable by current pulses representative of digitized information or video signals, so that each droplet expelled and propelled to the recording medium prints a picture element or pixel.

Typically, thermal ink jet printers use water-based fluids as inks and these water-based fluids have been observed to have undesirable properties. For example, these fluids tend toward heterogeneous nucleation of bubbles on the heating element. This means that while the fluids must be heated well beyond the normal boiling point in order to form an unstable, growing bubble, the temperature at which this occurs is dependent on the properties of the heating element surface. Other fluids such as, for example, 2-propanol, exhibit homogeneous nucleation so that the bubble formation event is unaffected by surface properties of the heating element.

If a fluid which exhibits homogeneous nucleation such as 2-propanol based fluid is used, the droplet volume and velocity increase with increasing heating pulse length. In contrast, when using a water-based ink in the thermal ink jet printer, droplet volume and velocity decrease with increasing heating pulse lengths. In 2-propanol based inks, the bubble is driven from the super heated liquid layer which builds up on the heating elements as the temperature increases to the nucleation temperature. The failure of the water-based inks to exhibit the characteristics seen with the 2-propanol type inks is attributed to the non-uniform nucleation of the water on the heating element surface. The spontaneous, full area nucleation of the liquid layer is required to achieve the desired the high droplet velocity and volume. The temporal variation in the nucleation process with water-base inks has been circumvented by using shorter heating pulses. Thus with a two microsecond heating pulse even though there remain variations in nucleation temperature, the total time variation is less than with a longer heating pulse, that is, for example, a 10 microsecond pulse.

Thus, while water-base inks are generally used for thermal ink jet printers, stable and reliable operation requires the use of short heating pulses. The short heating pulses, however, require high pulse power levels in order to achieve the same peak temperature during operation. In addition, because an array of thermal ink jet channels must be driven hard enough to assure that the highest nucleation temperature channel produces droplets, all other channels receive the same pulse and, therefore, are overdriven and overheated, presenting a heat removal problem for the printhead. The nucleation process requires that in order to form the essential unstable growing bubble in the printhead of thermal ink jet printers, the liquid vapor pressure must be greater than the internal pressure in the vapor bubble caused by the surface tension of the surrounding ink. In heterogeneous nucleation, the bubble forms at the surface and the contact angle of the liquid on the surface sets the curvature of the bubble and therefore its internal pressure. Once the bubble has grown large enough so that its internal pressure is lower than the vapor pressure of the surrounding superheated ink, the ink vaporizes to drive the bubble growth. Most liquids have a homogeneous nucleation temperature of around 90% of their critical boiling temperature, while heterogeneous nucleation occurs at lower temperatures. Water is unique in that while the homogeneous nucleation temperatures should be around 310° C., this temperature has not been experimentally achieved. Experiments have generally resulted in nucleation temperatures of about 200° C. for water on tungsten wire, and around 280° C. for water on silicon dioxide.

U.S. Pat. No. 4,409,039 to Lepesant et al relates to a high stability ink for an ink jet printer. The ink is a liquid having the structure of a micro-emulsion comprising a dispersing phase and a dispersed phase, the phases being separated from one another by an interfacial film which isolates the constituents of the two phases so that flocculation is avoided.

U.S. Pat. No. 3,577,515 to Vandegaer discloses a procedure for encapsulation by interfacial polycondensation, whereby minute capsules are formed consisting of a skin of organic composition enclosing an aqueous droplet. These capsules are produced by methods which include bringing into contact two liquids which are substantially immiscible and establishing a suspension of discrete separable spheres in a body of liquid.

U.S. Pat. No. 4,309,213 to Graber et al discloses a procedure for the encapsulation of a liquid hydrophobic substance by interfacial polycondensation involving an organic phase dispersed in an aqueous phase. The hydrophobic reagent continues through an additional polycondensation process using at least one di-functional or tri-functional amine as a hydrophilic reagent.

U.S. Pat. No. 4,395,288 to Eida et al discloses a process and composition for discharging droplets from a discharge orifice in a recording head in an ink jet recorder. A liquid recording medium consisting of a recording agent and a carrier liquid which is capable of dispersing and dissolving the recording agent is used.

U.S. Pat. No. 4,571,599 to Rezanka discloses the use a plurality of disposable, individually replaceable ink supply cartridges that are mountable on a carriage of an ink jet printer. Each cartridge has a thermal printhead fixedly attached thereto. A constant, slightly negative pressure is maintained at the nozzles of the printhead by means of a secondary reservoir with a level of ink maintained below the ink supply. The majority of the ink is stored in a hermetically sealed main reservoir in the cartridge which contains the ink supply at the negative pressure. A passageway provides ink from the main reservoir to the printhead nozzles. The secondary reservoir holds an air pocket at atmospheric pressure and releases air into the main reservoir as required to maintain the desired negative pressure constant therein as the ink supply is depleted.

U.S. Pat. No. 4,601,777 to Hawkins discloses a thermal ink jet printhead and method of fabrication. A plurality of printheads are concurrently fabricated by forming a plurality of sets of heating elements with their individual addressing electrodes on one wafer and etching corresponding sets of grooves which serve as ink channels with a common reservoir in another wafer. The two wafers are aligned and bonded together so that each channel has a heating element and then the individual printheads are obtained by milling away the unwanted wafer material to expose the addressing electrode terminals and then dicing the wafer with the sets of heating elements to obtain multiple printheads.

U.S. Pat. No. 4,638,337 to Torpey et al discloses an improved thermal ink jet printhead for ejecting and propelling ink droplets on demand along a flight path towards a recording medium spaced therefrom. Each printhead has a plurality of capillary filled ink channels. The channels have a droplet emitting nozzle on one end and connect to an ink supplying manifold on the other end. Each channel has a heating element upstream from the nozzle that is located in a recess. The heating elements are selectively addressable with a current pulse for substantially instantaneously vaporizing the ink contacting the addressed heating element to produce a bubble that expels a droplet of ink during its growth and collapse. The recess walls containing the heating elements prevent the lateral movement of the bubble through the nozzles and, therefore, the sudden release of vaporized ink to the atmosphere. This sudden release of vaporized ink, sometimes referred to as "blowout", causes ingestion of air and interrupts printhead operation.

SUMMARY OF THE INVENTION

It is an object of the present invention to provide stable, reliable operation of a thermal ink jet printer using water-based inks.

It is another object of this invention to provide a controllable nucleation temperature of the water-based ink by the use of a second suspended liquid which acts as a nucleation triggering liquid well below the normal nucleation temperature of the ordinary water-based inks.

It is still another object of this invention to provide a thermal ink jet printer using a water-based ink with a second liquid phase liquid suspended therein to enable the use of longer, low-powered heating pulses for the generation of the droplet expelling vapor bubbles.

In the present invention, a thermal ink jet printer uses a water-based ink containing a second liquid suspended therein to effect rapid bubble growth with lower pulse power levels. The second liquid containing, for example, hexane, acts as a nucleation trigger for the water-based ink. To be effective, the homogeneous nucleation temperature of the second liquid suspension must be below the inks's heterogeneous nucleation temperature and the suspended phase must be present in the form of small droplets with a high number density. Such a suspension or emulsion will lower the homogeneous nucleation temperature from about 280° C. for the water-based inks to about 210° C.

A more complete understanding of the present invention can be obtained by considering the following detailed description in conjunction with the accompanying drawings wherein like parts have the same index numerals.

DESCRIPTION OF THE PREFERRED EMBODIMENT

Figure 1:
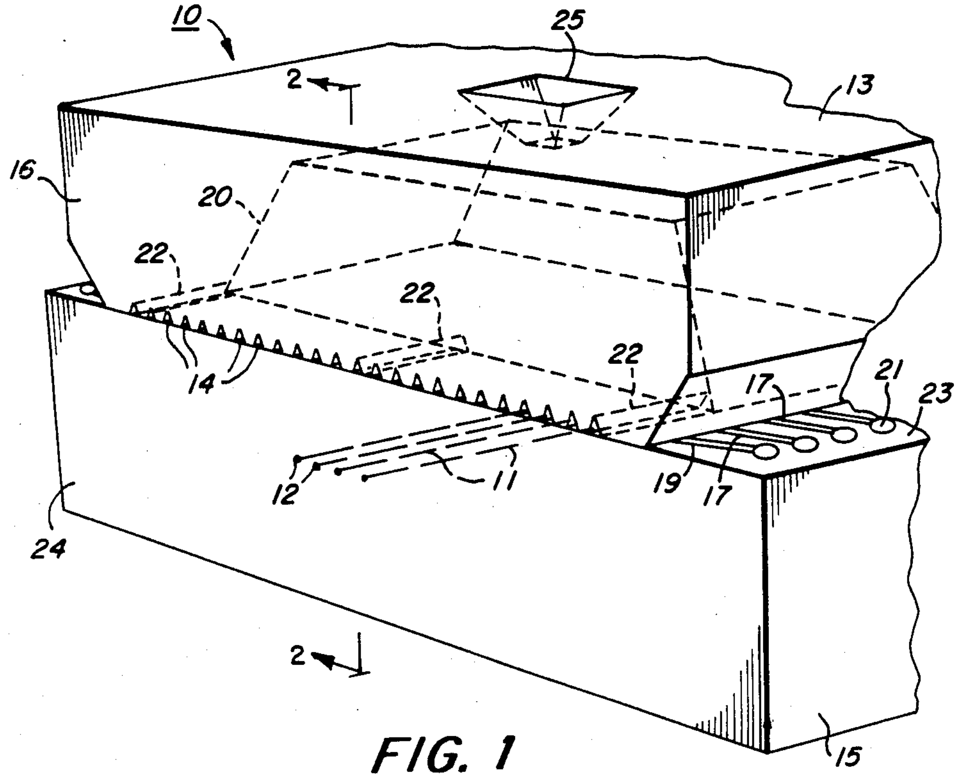
FIG. 1 is a schematic partial isometric view of the printhead of the present invention.

In FIG. 1, a schematic representation of the printhead 10 of the present invention is partially shown in isometric view with the ink droplet trajectories 11 shown in dashed line for droplets 12 emitted from orifices or nozzles 14 on demand. The printhead comprises a channel plate or substrate 13 permanently bonded to heater plate or substrate 15. The material of the channel plate is silicon and the heater plate 15 may be any dielectric or semiconductive material. If a semiconductor material is used for the heater plate, then an insulative layer must be used between the electrodes 17 and 19 discussed later. In the preferred embodiment, the material of both substrates is silicon because of their low cost, bulk manufacturing capability as disclosed in U.S. Pat. No. 4,601,777 to Hawkins. Channel plate 13 contains an etched recess 20, shown in dashed lines, in one surface which, when mated to the heater plate 15 forms an ink reservoir or manifold. A plurality of identical parallel grooves 22, shown in dashed lines and having triangular cross sections, are etched in the same surface of the channel plate with one of the ends thereof penetrating edge 16 of the channel plate. The others ends of the grooves open into the recess or manifold 20. When the channel plate and heater plate are mated, the groove penetrations through edge 16 produce the orifices 14 and the grooves 22 serve as ink channels which connect the manifold with the orifices. Opening 25 in the channel plate provides means for maintaining a supply of ink in the manifold from an ink source (not shown).

Figure 2:
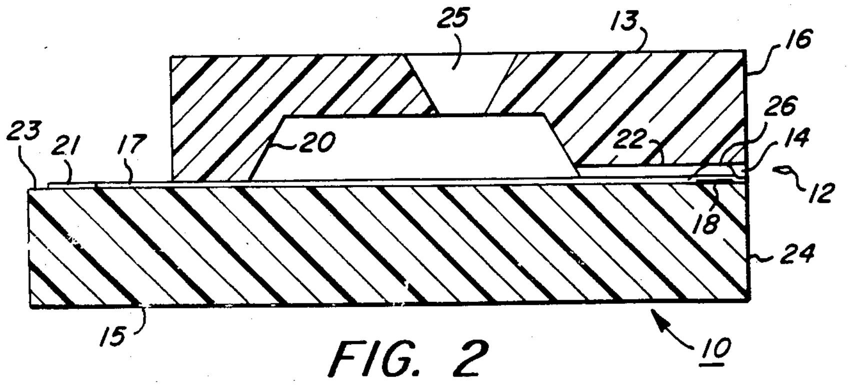
FIG. 2 is a partial view of the printhead as viewed along view line 2—2 of FIG. 1.

FIG. 2 is an enlarged cross-sectional view of the printhead as viewed along view line 2—2 of FIG. 1, showing the heating elements or resistors 18, individual addressing electrode 17, and terminal 21. The resistors are patterned on the surface 23 of the heater plate 15, one for each ink channel in a manner described by the above-mentioned patent to Hawkins et al, and then the electrode 17 and common return electrode 19 are deposited thereon. The addressing electrodes and return electrode connected to terminals 21 near the edges of the heater plate, except for the edge 24 which is coplanar with the channel plate edge 16 containing the orifices 14 (see FIG. 1). The grounded common return 19, better seen in FIG. 1, necessarily spaces the heating element 18 from the heater plate edge 24 and thus the orifices 14. The addressing electrodes and heating elements are both within the ink channels, requiring pin hole free passivation wherever the ink may contact them. The terminals 21 are used for wire bonding (not shown) the addressing electrodes and common return to a voltage supply adapted to selectively address the heating elements with a current pulse representing digitized data, each pulse ejecting a droplet from the printhead and propelling it along trajectories 11 to a recording medium (not shown) by the formation, growth, and collapse of bubble 26. Opening 25 enables means for maintaining the manifold 20 full of ink. As disclosed in U.S. Pat. No. 4,532,530 to Hawkins, the operating sequence of the bubble jet systems starts with a current pulse through the resistive heating element in the ink filled channel. In order for the printer to function properly, heat transferred from the heating element to the ink must be of sufficient magnitude to superheat the ink far above its normal boiling point. For water-based inks, the temperature for bubble nucleation is around 280°0 C. Once nucleated, the bubble or water vapor thermally isolates the ink from the heating element and no further heat can be applied to the ink. The bubble expands until all the heat stored in the ink in excess of the normal boiling point diffuses away or is used to convert liquid to vapor. The expansion of the bubble forces a droplet of ink out of the nozzle. Once the excess is removed, the bubble collapses on the heating element. The heating element at this point is no longer being heated because the current pulse has passed and concurrently with the bubble collapse, the droplet is propelled at a high rate of speed in the direction towards a recording medium. The entire bubble formation/collapse sequence occurs in about 30 microseconds. The channel can be refired after 100–500 microseconds minimum dwell time to enable the channel to be refilled and to enable the dynamic refilling factors to become somewhat dampened.

The nucleation process requires that in order to form a growing bubble, the liquid vapor pressure must be greater than the internal pressure in the bubble caused by surface tension of the surrounding liquid. In heterogeneous nucleation, the bubble forms at the surface, and the contact angle of the liquid on the heating element surface sets the curvature of the bubble and therefore its internal pressure. Once the bubble has grown large enough so that its internal pressure is lower than the vapor pressure of the surrounding liquid, that liquid vaporizes to drive the bubble growth.

Most liquids have a homogeneous nucleation temperature of about 90% of their critical temperature. The critical temperature is that temperature wherein the liquid instantaneously changes from the liquid to gaseous stage. Heterogeneous nucleation occurs at lower temperatures. Water is somewhat unique in that while the homogeneous nucleation temperature should be around 310° C., this temperature has not been achieved experimentally. To the contrary, experiments have produced nucleation temperatures of only about 200° C. for water on tungsten wire and about 280° C. for water on silicon dioxide.

It has been found that the bubble nucleation process can be made more reliable and repeatable by suspending a second liquid phase in the water-based ink. For a thermal ink jet use, the suspended liquid should have a homogeneous nucleation temperature lower than the heterogeneous nucleation temperature of water. As the liquid layer above the thermal ink jet heating elements is heated, the suspended phase must undergo homogeneous nucleation. The resulting vapor bubble will be then large enough that the surrounding super heated water layer can vaporize into the bubble and therefore drive the bubble growth. The suspended phase liquid acts as a trigger to start the major water vaporization step to effect growth.

In order to achieve success in controlling the nucleation of bubbles in water-based inks of thermal ink jet printers, the following requirements for the inks are generally required:

1. The homogeneous nucleation temperature of the suspended phase (trigger liquid) must be above the normal boiling point of the water, but below the water's heterogeneous nucleation temperature.

2. The suspended phase must be insoluble in the water.

3. The suspended phase must be present in the form of small droplets with a high number density to insure simultaneous nucleation over the entire heating element surface.

4. The suspension or emulsion must be stable with time, temperature, and shock due to bubble growth and collapse.

5. The materials used in the suspension must be stable against decomposition at the highest temperature achieved in the thermal ink jet printer.

The following example shows that suspending a second liquid phase of lower homogeneous nucleation temperature than the hetergeneous temperature of a water-based bubble jet ink is a viable concept for controlling the nucleation and bubble growth of the ink. A formulation for an oil and water microemulsion delineated in a paper entitled "Interreactions and Reactions in Microemulsions" by R. A. Mackay et al, and published in Micellization, Solubilization and Microemulsions, Volume 2; K. L. Mittal, Editor; Plenum Press in 1977, was determined to be acceptable for controlled nucleation of the ink in a thermal ink jet printer. This formulation contains 24.1 grams Tween 60 surfactant, 12.6 grams Hexyl alcohol, 13.3 grams hexane, and 300 grams of water. This emulsion was prepared by heating and stirring the first three ingredients to effect a clear solution and then adding the water with stirring. The emulsion becomes turbid at temperatures below about 50° C., but optical microscopy could detect no large suspended droplets. In this example, a heater plate with nickel chromium heaters was overcoated with 0.5 micrometers of silicon dioxide and was used to test the above emulsion. First, a drop of pure water was placed over the heaters and a current pulse applied to one of the heaters. The water layer was microscopically observed using strobe illumination synchronized with the heating pulse while the pulse current was increased until the bubble was observed. The particular heater plate used has resistors which taper in width from the narrower address lead end to the wider common lead end. At any given time then during the heating pulse, the narrow end of the resistor should be hotter than the wide end. Use of a 2-propanol on this type heater results in bubbles which start at the narrow end of the heater and progress to the wider end with time and/or greater heater current.

With water on the heater, a bubble started near the address lead end at 317 milliamps of heater current using a 10 microsecond pulse. At about 325 milliamps, a second bubble started near the common lead end; and at about 340 milliamps, most of the surface of the heater was covered with a bubble although regions near where the bubble started had nearly collapsed. The water was then removed from the heater plate and a drop of the above-described emulsion put in its place. The same heater was used to form bubbles in the emulsion, but the bubbles started at the narrow address end at 275 milliamps and smoothly progressed to the common lead end at 290 milliamps. A much more regular shaped bubble has formed with the emulsion and there was no early nucleation near the common lead end. The nucleation temperature of water on similar surfaces has been measured and found to be about 280° C. Using this value for water, then the nucleation temperature of the emulsion may be approximated by squaring the ratio of the currents $(275/317)^2$ and multiplying this squared ratio times 280° C.; the value so calculated in about 210° C. This value is in reasonable agreement with the homogeneous nucleation temperature of hexane which is about 190° C.

In another test, the emulsion above was placed over a nickel chrome heater element as described above, except that the width of the heater element was constant from end to end in this case. Stroboscopically observing the vapor bubbles formed in the liquid due to electrical pulses in the heater revealed that the emulsion gave larger, more symmetrical bubbles than could be achieved using the same heater element with water in place of emulsion. The current required to produce a full, symmetrical bubble in the emulsion was 305 milliamps for a 10 microsecond pulse; when water was used inplace of the emulsion, 343 milliamps were required at the same 10 microsecond pulse width, and the bubble was smaller and less symmetric.

Suspending a second liquid phase of lower homogeneous nucleation temperature than the heterogeneous nucleation temperature of water in water-based thermal ink jet provides a trigger for bubble generation. When the second liquid generates a bubble, the surrounding superheated water can vaporize to enlarge the bubble and drive the jet. Use of such an ink in a thermal ink jet printer provides the advantages of stable, reliable operation with water-based inks, controllable nucleation temperature, and use of longer, lower-power heating pulses; i.e., reduced current and/or voltage.

Many modifications and variations are apparent from the foregoing description of the invention and all such modifications and variations are intended to be within the scope of the present invention.

I claim:

1. A thermal ink jet printer having ink nucleation control, comprising:

a printhead having an ink supply reservoir, a plurality of capillary filled ink channels, each communicating at one end with the reservoir and at the other end having an opening which serves as a nozzle, each channel having a bubble generating heating element adjacent but upstream from the nozzle;

means for supplying ink to the printhead reservoir, said ink being an emulsion comprising a water-based ink phase and second liquid disperse phase suspended therein, the second liquid disperse phase having a homogeneous nucleation temperature below the heterogeneous nucleation temperature of the water-based ink phase and being in the form of relatively small droplets suspended throughout the water-based ink phase;

means for selectively applying current pulses representative of digitized data to each of the printhead heating elements to generate thermal energy which is transferred to the ink contacting the heating elements thereby causing the ink to produce temporary bubbles which expel and propel droplets to a recording medium; and said second liquid disperse phase providing a sufficiently high droplet density per unit volume of ink emulsion to initiate nucleation of the ink emulsion contacting the respectively pulsed heating elements at a temperature below that of water-based inks alone and to grow the bubbles with lower pulse power levels.

2. The ink jet printer of claim 1, wherein the printhead comprises a silicon channel plate with anisotropically etched channels and reservoir bonded to a silicon heater plate having heating elements and addressing electrodes formed thereon with an insulative layer intermediate the electrodes and heater plate and a passivation layer thereover; and wherein the nucleation temperature of the ink emulsion is about 210° C.

3. An improved thermal ink jet printer of the type having a printhead with an internal ink reservoir, a plurality of nozzles, a plurality of capillary filled ink channels which interconnect the nozzles to the reservoir, and a heating element in each channel a predetermined distance upstream from its associated nozzle, an ink supply to maintain ink in the printhead reservoir, and means for selectively applying a current pulse representation of digitized data signals to each heating element for the ejection of an ink droplet in response to the application of each current pulse, wherein the improvement comprises:

use of a water-based heterogeneous ink having suspended therein a liquid that is insoluble in water and forms therewith an emulsion, the liquid being the disperse phase and having a high number density per unit volume of relatively small droplets of said liquid disperse phase suspended throughout the ink, the liquid disperse phase having a homogeneous nucleation temperature above the boiling point of the ink but below the heterogeneous nucleation temperature of the ink, said emulsion being stable with time, temperature, and shock due to bubble growth and collapse and stable against decomposition at the highest temperature reached by the emulsion during operation of the ink jet printer, whereby the suspended liquid disperse phase provides a trigger for bubble generation of the ink emulsion at a nucleation temperature well below that of ink alone.

4. The improvement of claim 3, wherein the liquid contains 24.1 grams of Tween 60 surfactant, 12.6 grams of Hexyl alcohol, and 13.3 grams of hexane for each 300 grams of water-based ink; and wherein the emulsion is prepared by heating and stirring the liquid to effect a clear solution and then adding the water-based ink with stirring.

5. The improvement of claim 4, wherein the homogeneous nucleation temperature of the emulsion is about 210° C.

* * * * *